(12) United States Patent
Harris

(10) Patent No.: US 6,394,203 B1
(45) Date of Patent: May 28, 2002

(54) METHOD FOR DESIGNING LOW-VIBRATION OMNI-DIRECTIONAL WHEELS

(75) Inventor: Donald Barnett Harris, Arlington, VA (US)

(73) Assignee: Airtrax Corporation, Hammonston, NJ (US)

( * ) Notice: Subject to any disclaimer, the term of this patent is extended or adjusted under 35 U.S.C. 154(b) by 0 days.

(21) Appl. No.: 10/003,424

(22) Filed: Dec. 6, 2001

Related U.S. Application Data

(62) Division of application No. 09/549,998, filed on Apr. 14, 2000, now Pat. No. 6,340,065.

(51) Int. Cl.[7] ............................. B62D 57/00; B60B 19/12
(52) U.S. Cl. ............................. 180/7.1; 180/7.2; 180/20; 301/5.23
(58) Field of Search ............................. 180/7.1, 7.2, 20; 301/5.23, 5.3

(56) References Cited

U.S. PATENT DOCUMENTS

| | | |
|---|---|---|
| 3,789,947 A | 2/1974 | Blumrich |
| 3,876,255 A | 4/1975 | Ilon |
| 4,223,753 A | 9/1980 | Bradbury |
| 4,237,990 A | 12/1980 | La |
| 4,335,899 A | 6/1982 | Hiscock |
| 4,598,782 A | 7/1986 | Ilon |
| 4,715,460 A | 12/1987 | Smith |
| D318,219 S | 7/1991 | Guile |
| D318,791 S | 8/1991 | Guile |
| 5,246,238 A | 9/1993 | Brown |
| 5,374,879 A | 12/1994 | Pin et al. |
| 5,701,966 A | 12/1997 | Amico |
| 6,340,065 B1 * | 1/2002 | Harris ........................ 180/7.2 |

FOREIGN PATENT DOCUMENTS

EP 768076 4/1997

OTHER PUBLICATIONS

Francois Pin: "A New Family of Omnidirectional and Holonomic Platforms for Mobile Robots," IEEE Trans. On Robotics and Automation, Aug. 1994, vol. 10, No. 4, IEEE.

Hoodbhoy: "Designing With Plastic–Cast Solid–Polyurethane Industrial Tires," Plastics Engineering, Aug. 1976, vol. 32, No. 8.

Trade Brochure entitled: "Omnidrive Carrier System," distributed by Miag Fahrzeygbau GmbH, not dated.

Multi–Track from Mecanum (Magazine Article).

H. Karl Biester, Department of the Navy Naval Air Warfare Center, Product Evaluation and Verification Department Letter Report: Omni–Directional Vehicle (ODV) Operation Field Evaluation: Report No. NAWCADLKE–TA132, pp 1–8, Nov. 30, 1993.

* cited by examiner

Primary Examiner—Brian L. Johnson
Assistant Examiner—Matthew Luby
(74) Attorney, Agent, or Firm—Foley & Lardner

(57) ABSTRACT

An omni-directional wheel for an omni-directional vehicle that exhibits constant ride height, low vibration, and reduced maximum ground contact pressure is disclosed. The invention consists of a wheel assembly rotatably connected to the omni-directional vehicle chassis. The wheel assembly comprises a hub on which free spinning rollers are rotatably mounted at an angle to the wheel axis. Constant ride height and low vibration operation are accomplished by configuring the rollers with an exterior profile, thickness, material properties and surface grooving to achieve constant deflection of the roller contact surface at all wheel rotation angles.

4 Claims, 7 Drawing Sheets

METHOD FOR DESIGNING LOW-VIBRATION OMNI-DIRECTIONAL WHEELS

This application is a divisional of U.S. application Ser. No. 09/549,998, filed Apr. 14, 2000, now U.S. Pat. No. 6,340,065, by Donald Barnett Harris, and which is incorporated by reference herein.

CROSS-REFERENCE TO RELATED APPLICATIONS

U.S. application Ser. No. 09/056,109, filed Apr. 6, 1998.

STATEMENT OF GOVERNMENT INTEREST

Not Applicable.

BACKGROUND OF THE INVENTION

The present invention relates generally to the design of wheels and wheel components used with omni-directional vehicles employed in commercial, medical, industrial, and recreational settings.

Omni-directional vehicles capable of controlled motion in any direction have long been recognized as having many useful applications. A number of designs of omni-directional vehicles have been disclosed. Most omni-directional vehicle designs are similar in that they use wheels that feature a number of rollers positioned about the periphery of the wheel; the rollers permit the wheels to support motion in directions at an angle to the wheel's plane of rotation. Omni-directional vehicles using such omni-directional wheels can move in any direction by rotating the wheels and rollers in an appropriate combination. Each omni-directional wheel's rotation is mechanically driven and servo controlled in a coordinated fashion to cause the vehicle to follow a desired path as previously disclosed by Ilon in U.S. Pat. No. 4,598,782. Three, four, or more omni-directional wheels are connected to a suitable chassis, suspension, wheel drives, and controls to form an omni-directional vehicle. Hereinafter, all uses of the words "roller" and "rollers" refer to the type of rollers used on or designed for omni-directional wheels for omni-directional vehicles.

Omni-directional wheels can be grouped into two general classifications. The first class of wheels is comprised of a rigid hub that supports a number of free spinning rollers around its periphery. The hub is rigidly coupled to an axle that, along with other omni-directional wheels and axles, supports the vehicle. The rollers are mounted at an oblique angle to the wheel's axle and are free to rotate about their own axles. Omni-directional wheel roller mounting angles of ninety degrees have been disclosed by Blumrich in U.S. Pat. No. 3,789,947. The omni-directional wheel disclosed by Blumrich was mechanically driven to produce motion parallel to the axis of rotation of the wheel. Omni-directional wheel designs with a ninety-degree roller mounting angle and free-spinning rollers have been disclosed by Bradbury in U.S. Pat. No. 4,223,753; Hiscock in U.S. Pat. No. 4,335,899; Smith in U.S. Pat. No. 4,715,460; and Guile in U.S. Pat. Nos. D318,219 and D318,791. Omni-directional wheels with rollers mounted obliquely at roller mounting angles of approximately forty-five degrees with respect to the wheel shaft have been disclosed by Ilon in U.S. Pat. No. 3,876,255 and Amico in U.S. Pat. No. 5,701,966. U.S. Pat. Nos. 3,876,255 and 5,701,966 are hereby incorporated by reference in their entirety.

The second class of omni-directional wheels differ from the above described omni-directional wheel design concepts in that the rotational axes of the free spinning rollers intersect with the wheel's axis of rotation. Wheels of this class have been disclosed by Bradbury in U.S. Pat. No. 4,223,753, and by Pin, et al, in U.S. Pat. No. 5,374,879. In wheels of this class, two or more spherical rollers are mounted in fixed positions so as to constrain the vehicle's motion in the direction of wheel rotation, while being unconstrained in a direction that is orthogonal to the wheel's axis.

In all classes of omni-directional wheels, the axle supporting each roller may be mounted to the omni-directional wheel hub at both ends of the roller, as disclosed by Blumrich, in the center, as disclosed by Ilon and Amico, or at intermediate locations, as disclosed by Smith. Typically, omni-directional wheel rollers are coated with an elastomer surface contact material to improve traction, as disclosed by Blumrich, Ilon and Smith.

The ability to move in any direction or rotate within the perimeter of the vehicle is advantageous for any industrial or commercial vehicle that must be maneuvered within confined warehouse spaces, including forklifts, scissorlifts, aircraft support and maintenance platforms, motorized dollies, and delivery trucks. Forklifts are particularly suited to omni-directional capability. As is well known in the art, forklifts are vehicles with a hydraulically or mechanically powered liftforks that are used to lift, support and position a load. Similarly, the ability to move laterally and rotate enables easy and precise positioning of omni-directional scissorlifts and without the need for room to turn as required for a conventional scissorlift. As is well known in the art, a scissorlift is a vehicle that features a work platform suitable for supporting a worker that is hydraulically or mechanically raised or lowered to place the platform at the elevation where work is to be accomplished. Other vehicles that will benefit from omni-directional capability include wheelchairs, whether of self-propelled or unpowered designs that are well known in the relevant art. Omni-directional capability permits the wheelchair operator to maneuver freely in confined spaces such as elevators and subway cars. The ability to move laterally at will is of particular value to wheelchair operators. Omni-directional mobility is also of value for a wide variety of industrial and military uses including material transportation within a factory, aircraft maintenance, and any other use where precise, controlled omni-directional motion is desired.

Despite the known commercial need for omni-directional vehicles, none have achieved widespread commercial success due in part to the vibration and uneven ride produced by the omni-directional wheels employed to date. When a roller of an omni-directional wheel contacts the ground and assumes the load of the vehicle's weight, the contacting surface of the roller deflects in response to the applied load. As each omni-directional wheel turns, the area contacting the ground shifts across the surface of each roller, so the portion of the roller supporting the vehicle's weight changes as the wheel turns. As a result of the roller's spherical, tapered or convexedly vaulted shape, the roller's ground contacting surface compliance, which is the mathematical measure of the amount by which the contacting surface deflects in response to the applied load, varies depending upon where on the roller surface the ground is contacted. In general, elastomer-coated rollers of a smaller diameter will exhibit greater compliance than similar rollers of a larger diameter, all things being otherwise equal. For this reason, rollers are more compliant at their ends where their diameter is smaller than near their middle where their diameter is larger. In addition, rollers that are mounted to the hub by a central or intermediate attachment(s) exhibit greater compliance when the ground contacting surface spans the gap in the roller where the attachment is affixed. The varying compliance of the rollers as the wheel turns results in ride height fluctuation as the omni-directional vehicle transits a smooth surface. The ride height fluctuation causes unacceptable vehicle vibration, the magnitude of which becomes more acute at higher transit speeds.

The load capacity of a solid elastomer-coated roller is generally related to the ratio of the deflection of the elastomer when loaded to its undeflected thickness. Persons practiced in the art of designing wheels and rollers prefer a deflection-to-undeflected-thickness ratio of 0.07 to 0.15 when selecting elastomer materials and wheel diameters, and in all cases design wheels so they exhibit a ratio less than 0.25. Omni-directional wheels that use rollers with a convexedly vaulted profile, which have a smaller diameter at the ends than in the middle, are limited in load capacity to loads which are less than can be carried by a conventional wheel with the same outer diameter. Rollers that are mounted to the wheel hub by a central attachment or multiple intermediate attachments have even lower capacity due to the greater deflection that occurs when the ground contacting surface spans the gap in the roller where the attachment is affixed.

Therefore, to achieve the commercial potential of omni-directional vehicle technology, omni-directional wheel designs are needed that exhibit constant compliance while rotating under load and thus produce unchanging ride height as the vehicle transits over smooth surfaces, thereby reducing vehicle vibration. Furthermore, an omni-directional wheel with greater load capacity is needed.

BRIEF SUMMARY OF THE INVENTION

This invention is an omni-directional wheel that exhibits constant vehicle ride height, low wheel vibration, and high load capacity. This invention includes a design for rollers for omni-directional wheels that produce little or no wheel rotation-induced ride height fluctuation for an expected range of loading. This invention includes the application of the low-vibration omni-directional wheels on forklift, scissor-lift and wheelchair vehicles. This invention also includes a method for designing omni-directional wheel rollers to provide low vibration performance when used on an omni-directional vehicle.

Advantages

This invention improves the ride performance of omni-directional vehicles, reducing vibration and ride height variation, thereby eliminating a major impediment to widespread commercial application of omni-directional vehicles. By reducing the amount of vibration caused by the wheel this invention enables omni-directional vehicles to operate at higher transit speeds. This invention increases the load capacity for omni-directional wheels, so that an omni-directional vehicle can be modified to carry greater loads simply by replacing the rollers with rollers designed as herein disclosed. Also, this invention reduces the peak average wheel footprint contact pressure, and thereby permits omni-directional vehicles to operate on surfaces with lower compressive strengths.

DETAILED DESCRIPTION OF THE INVENTION

This invention is described below showing details of the presently preferred embodiments of omni-directional wheels, rollers for omni-directional wheels, and vehicles using such wheels. It will be apparent to those skilled in the relevant art that some features which are not relevant to the invention may not be shown for the sake of clarity.

Figure 1:
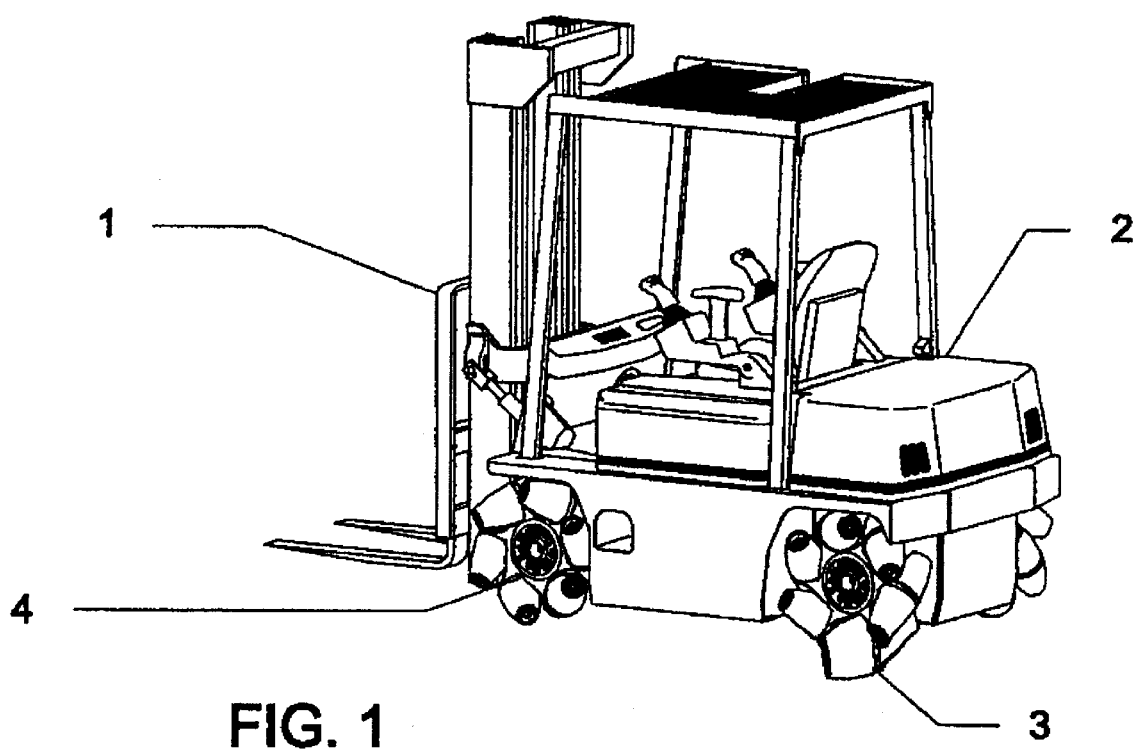
FIG. 1 shows a perspective view of a four wheeled omni-directional forklift vehicle equipped with omni-directional wheels comprised of six rollers which are center-supported and positioned with a roller mounting angle of forty-five degrees.

Referring to FIG. 1, an-omni-directional vehicle such as a forklift 1 is comprised of a vehicle chassis 2, three or more omni-directional wheels 3, wheel axles 4 which connect the wheels 3 to the chassis 2, and drive mechanisms (not shown) that rotate the wheels 3 to cause the vehicle to move. A vehicle control system (not shown), such as that disclosed by Amico in U.S. Pat. No. 5,701,966, controls the drive mechanisms and coordinates the rotation of the wheels to cause simultaneous vehicle rotation and translation in longitudinal and transverse directions in response to operator commands.

Figure 2:
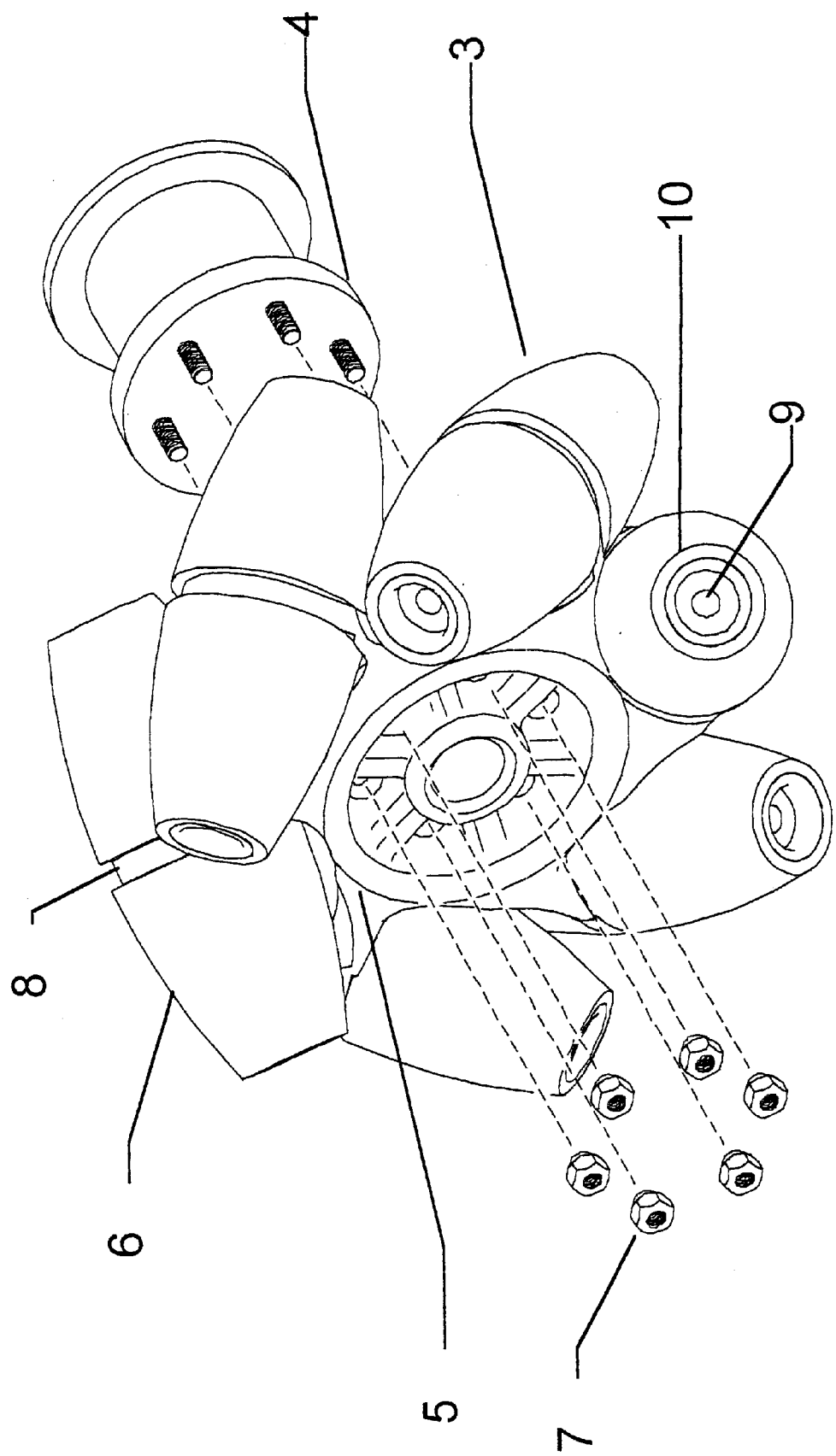
FIG. 2 shows an exploded view of an omni-directional wheel comprised of six center-supported rollers positioned about the hub with a roller mounting angle of forty-five degrees, showing hub, rollers, roller mounting structure and other structure for affixing the wheel to the vehicle.

Key to the operation of an omni-directional vehicle is the design of the omni-directional wheels. A typical omni-directional wheel is shown in FIG. 2. Referring to FIG. 2, the omni-directional wheel 3 is comprised of a hub 5 that supports a number of rollers 6 and is mounted to the wheel axle 4 which is coupled to the vehicle. The rollers 6 are coupled to the hub 5 by roller mounting brackets 8 in fixed positions about the periphery of the hub 5 so the roller axles 9 are at a fixed angle with respect to the wheel axle 4. The acute angle formed by projecting the centerline of the roller axle 9 onto the center line of the wheel axle 4 is defined as the roller mounting angle. Omni-directional wheels may be designed with roller mounting angles of between approximately twenty degrees and ninety degrees, but roller mounting angles of approximately forty-five and ninety degrees are most commonly used in practice. The number of rollers 6 on an omni-directional wheel 3 is variable from a minimum of four, with six to eight rollers being most commonly used in practice. Rollers 6 have a flexible ground contacting material 10 typically made from an elastomer such as rubber or urethane. Omni-directional wheel roller ground contacting surface 10 have typically been designed with a convexedly vaulted exterior profile which is based upon the number of rollers mounted on the hub, the diameter of the omni-directional wheel, the roller center diameter, and roller angle such that when the omni-directional wheel 3 turns its contact with the ground shifts from roller to roller in a continuous fashion.

Prior descriptions of omni-directional wheels have emphasized the importance of designing the contour of the rollers and mounting the rollers about the hub so as to ensure their undeflected contact surfaces form an unbroken smooth circular profile when viewed from a perspective laterally displaced from and coincident with the centerline of the wheel. The roller profile that results in this smooth circular wheel profile is herein referred to as the "round profile."

Prior descriptions of omni-directional vehicles stress that omni-directional wheels must be designed with roller ground contacting surfaces configured such that there is an unbroken arc from roller to roller so the wheel has a circular profile when viewed side-on. However, practical application has demonstrated that omni-directional wheels designed with such a circular periphery cause vehicle vibration and varying ride height when rotated while supporting a loaded vehicle. Vehicle vibration and ride-height variation result from the uneven compliance of the roller ground contacting surface over the profile of the roller. Since the thickness of the elastomer and diameter of a "round profile" roller varies along the length of the roller due to its convexedly vaulted profile, the amount of compliance exhibited under load varies as the ground contact patch shifts along the length of the roller as the wheel turns. As a result of this variation in roller compliance, omni-directional wheels designed according to previous descriptions exhibit apparent flat spots when operated under load, which produce an uneven vehicle ride. This invention eliminates the apparent flat spots by configuring rollers with a different profile or varying the stiffness of the ground contacting material, or by a combination thereof, such that the effective profile of the omni-directional wheel under load is circular.

Figure 3:
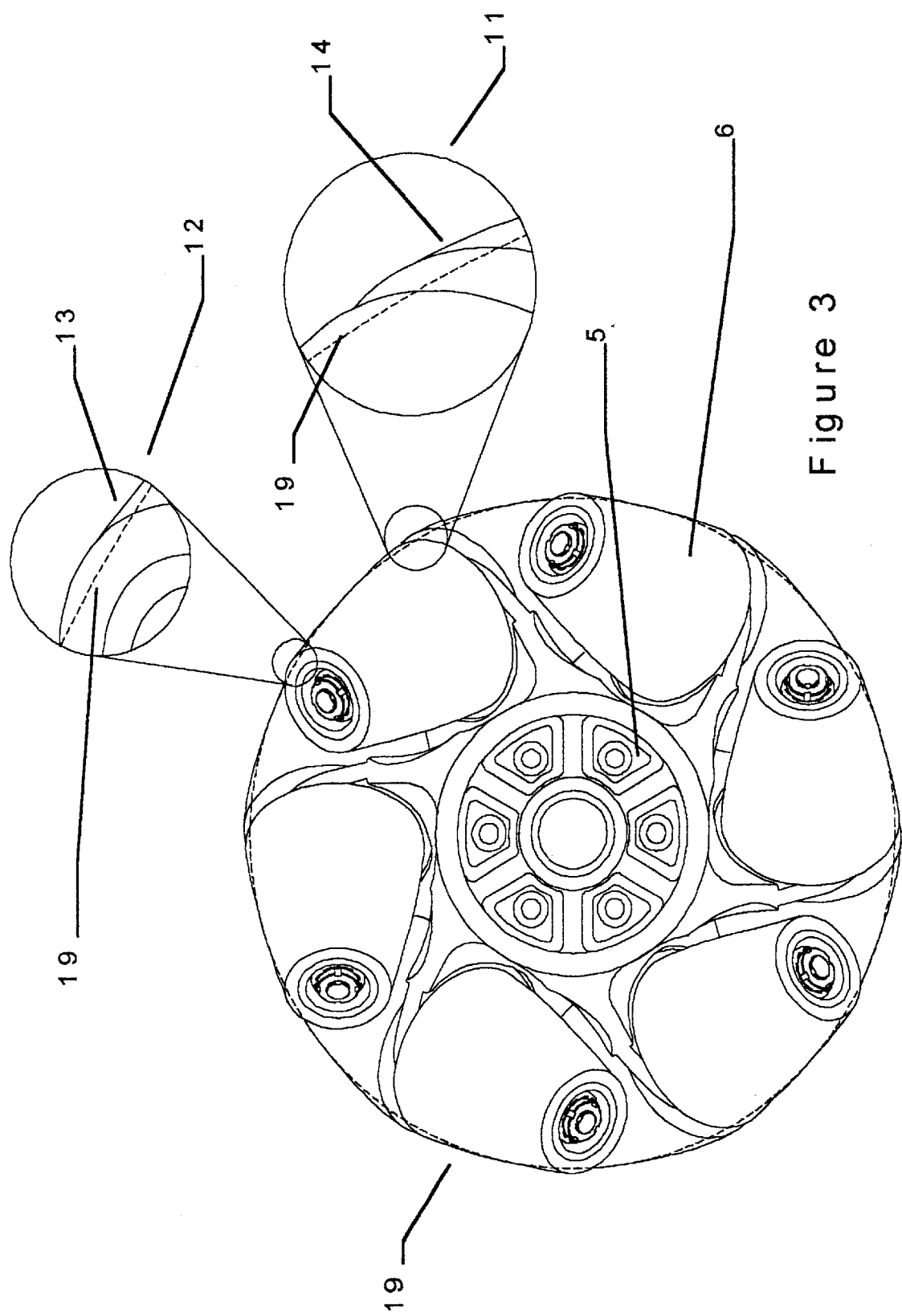
FIG. 3 shows a profile view of an omni-directional wheel comprised of six center supported-rollers positioned with a roller mounting angle of forty-five degrees, showing how the rollers are shaped and positioned around the hub to form a circular profile.

It is noteworthy that an omni-directional wheel using rollers incorporating an embodiment of this invention will have a noncircular profile, which contradicts the teachings of prior omni-directional wheel disclosures. The noncircular wheel profile is shown in FIG. 3, which depicts an omni-directional wheel with six rollers set at a 45 degree angle to the wheel axle. Each roller 6 is mounted to the hub 5 by means of a mounting bracket 8. A circular dashed line 19 is presented concentric with the wheel periphery, which shows the nominal radius of the wheel. A detail of the roller end 12 clearly depicts the deviation of the roller surface at the end 13 from the dashed line demarking the round profile 19. A detail 11 of the roller adjacent to the supporting bracket 8 clearly shows the deviation of the roller surface 14 from the dashed line demarking the round profile 19.

Figure 4:
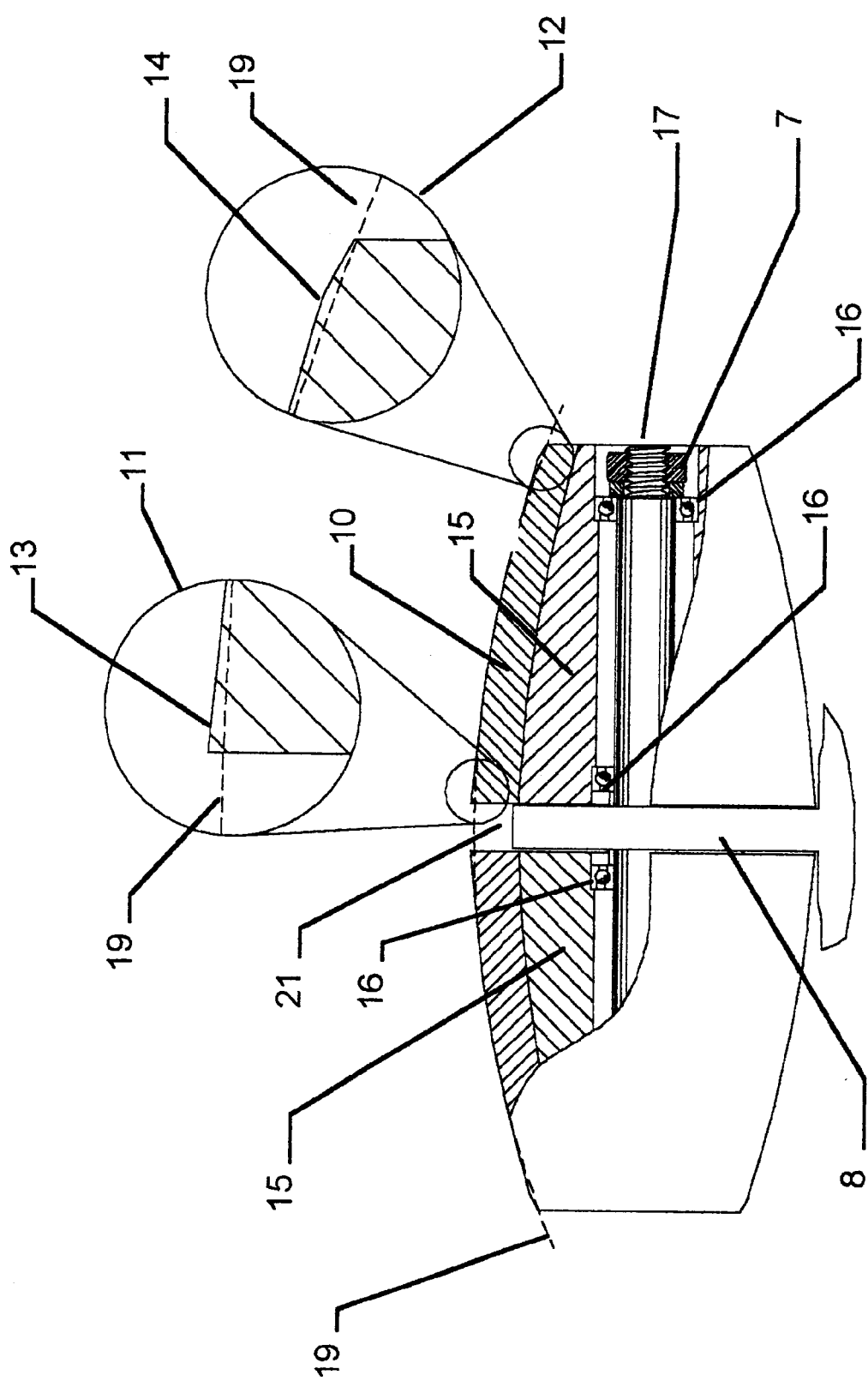
FIG. 4 is a sectional view of a roller for a omni-directional wheel showing roller structure and an embodiment that achieves low vibration operation by means of an exterior profile which deviates from shape that will give the omni-directional wheel a circular profile.

FIG. 4 shows a sectional view of a roller 6 and a portion of the roller mounting bracket 8. The roller is a solid body of revolution comprised of a core 15 made of a metallic, composite, plastic, ceramic or other suitable structural material, and a ground contacting surface 10 that is bonded, cast, welded, bolted, swaged or otherwise suitably coupled to the core 15. The core 15 is rotatably coupled to the roller mounting bracket 8 by one or more anti-friction bearings 16. A variety of anti-friction bearings may be used depending upon the configuration of the roller 6, including ball bearings 16 as shown in FIG. 4. The roller is captured on the shaft by a threaded securing nut 7 or other suitable structure for attachment.

A variety of designs are possible for supporting the core 15 on anti-friction bearings 16 and coupling the bearings to the roller mounting bracket 8. FIG. 4 shows one configuration wherein the roller axle 17 is welded or otherwise mechanically coupled to the roller mounting bracket 8, and bearings 16 are mounted onto the roller axle 17. The roller core 15 rides on bearings located axially so the roller is free to roll in either direction. Alternatively, the roller core can be rigidly coupled to or formed as a single unit with the roller axle, in which case the roller bearings are mounted between and coupled to the roller core and the roller mounting bracket.

As shown in FIG. 4, the roller mounting bracket 8 may support the roller axle 17 and core 15 near the midpoint between the two roller 6 ends. In such a configuration, the roller 6 is comprised of two roller segments rotatably coupled to the roller axle 17 and separated by a gap 21 where the roller mounting bracket 8 attaches to the roller axle 17. Alternatively, the roller mounting bracket can be designed to support the roller core 15 or roller axle 17 at either end of the roller 6. Additionally, there may be one, two, three, or more mounting brackets 8 supporting each roller 6, in which case, the roller will be comprised of a plurality of roller segments supported by either a common roller core or a common roller axle.

The roller contacting surface 10 is made of a flexible material that will deflect at the point of contact with the ground to spread the applied load onto a finite area on the ground. The ground contacting surface 10 may be made of an elastomer, such as urethane or natural rubber, which will have the added benefit of providing traction with the ground surface. The elastomer may be reinforced with fibers such as fiberglass and friction-enhanced with materials such as carbon black. Additionally, other materials may be used for higher load applications, such as glass filled nylon.

When an omni-directional wheel 3 supports the weight of a vehicle, the load is transmitted through the axle 4 to the hub 5, then through the roller mounting bracket 8 to the roller bearing 16 which transmits the load to the roller core 15 and through it to one or more rollers 6 whose surface material 10 is in contact with the ground, where the load is applied to the ground.

In use, the omni-directional vehicle 1 shown in FIG. 1 is capable of moving in any direction due to the interplay between the rollers 6 and the omni-directional wheels 3. As the omni-directional wheel 3 is rotated, the roller 6 in contact with the ground may turn about its shaft 17 in response to any torsional load. The rolling resistance in a direction normal to the roller shaft 17 is small so the omni-directional wheel 3 is essentially free to move over the ground in a the direction normal to the roller shaft 17 and constrained from moving in a direction parallel to the roller shaft 17. Rotation of the omni-directional wheel 3 causes the point on the roller 6 contact surface 10 in contact with the ground to move from one end of the roller 6 to the other until the wheel 3 has turned enough so that the next roller in sequence about the periphery comes in contact with the ground and assumes the load. As the point of contact with the ground shifts along the length of the roller 6, a force parallel to the roller shaft 17 is imparted to the hub 5, and through the wheel axle 4 to the vehicle 1 itself. Controlled omni-directional vehicle motion can be obtained by coordinated rotation of the wheels in a manner previously disclosed by Ilon in U.S. Pat. No. 3,746,112.

In the first preferred embodiment of this invention shown in FIG. 4, the exterior profile of the roller 6 contacting surface 10 deviates from the "round profile" 19 depicted as a dotted line such that the roller has enlarged diameters near the roller ends 20 and the gap 21. Specifically, the roller 6 has added ground contacting surface material about the roller ends 20 and adjacent to the gap 21 to compensate for the increased compliance in those portions of the roller 6. This is shown in details 11 and 12 where the roller 6 surfaces 13 and 14 are not coincident with the "round profile" 19 depicted as a dashed line. The additional material near the roller ends 20 compensates for the increased compliance that results from the smaller diameter in that portion of the roller compared to the rest of the roller. The additional material near the gap 21 compensates for the greater compliance that results from the reduced lateral support adjacent to the gap 21. As a result of this improvement in roller design, when the roller 6 contacts the ground under load, the roller contacting surface 10 near the roller ends 20 and adjacent to the gap 21 deflects such that the wheel ride height does not change, which causes the omni-directional wheel to exhibit nearly constant ride height. As a result of the added material at the roller ends 20 and adjacent to the gap 21, the profile of the roller 6 is different from the convexedly vaulted profile that has been taught in previous omni-directional wheel disclosures.

Figure 5:
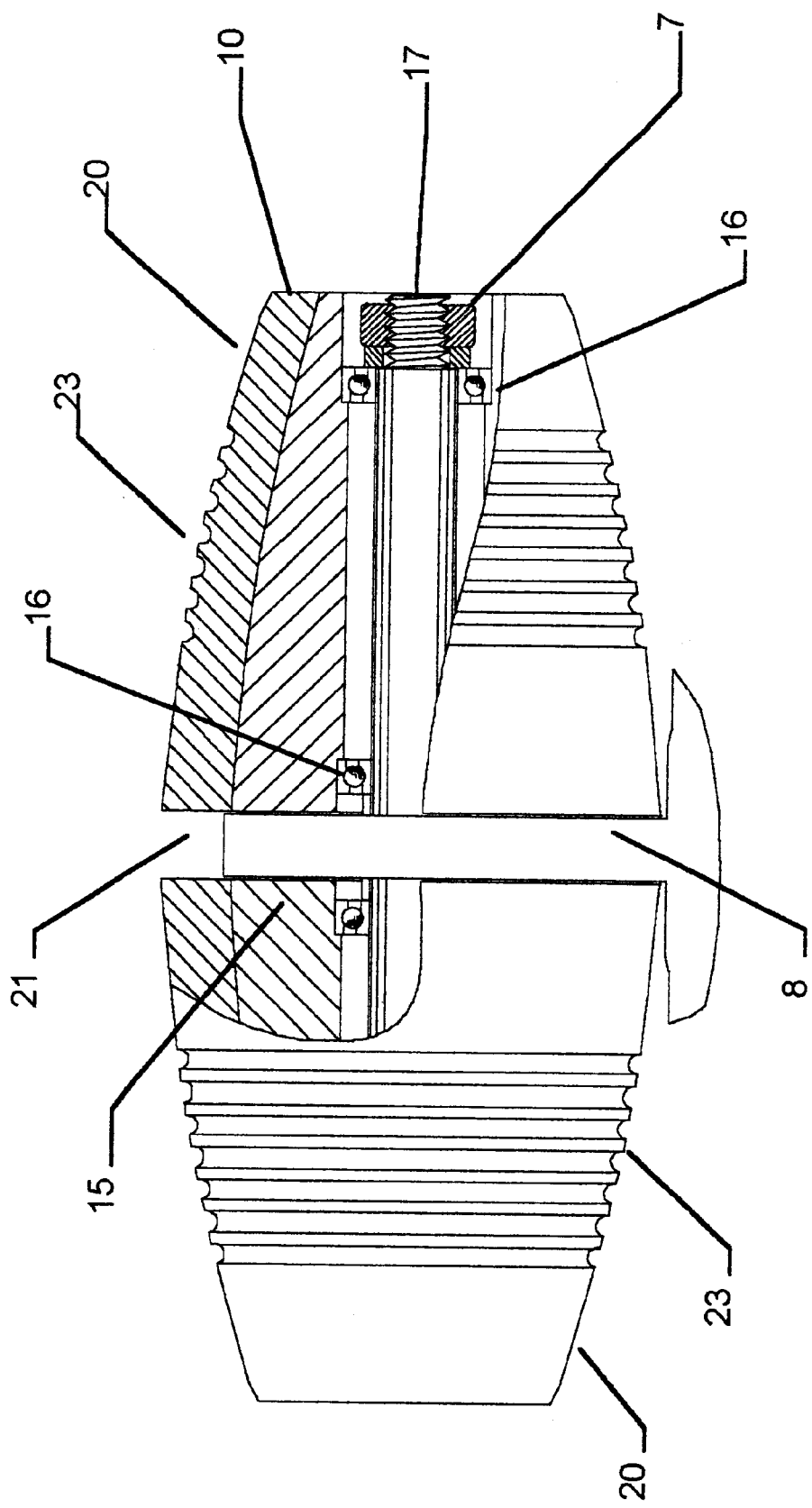
FIG. 5 is a sectional view of a roller for an omni-directional wheel showing roller structure and an embodiment that achieves low vibration operation by means of grooves in the contact surface.

Referring to FIG. 5, a second preferred embodiment of this invention achieves low vibration operation by varying the effective material stiffness of the roller contacting surface 10 along the length of the roller 6 through the use of grooves 23 in the surface in zones of lower compliance. Specifically, grooves 23 in the roller contacting surface 10 serve to reduce the average stiffness of the surface contacting material 10, and thereby increase the compliance of the surface in the zones containing the grooves 23. As shown in FIG. 5, grooves 23 are located on the roller 6 in the zone removed from the roller ends 20 and the gap 21. By selectively placing grooves 23 of the appropriate width, depth and spacing on the roller contacting surface 10 in the zones where the roller 6 has the lowest compliance (i.e. lowest amount of deflection under load), the roller 6 can be designed to have near-constant deflection as the point of contact with the ground shifts along the length of the roller 6. Because a roller incorporating this embodiment undergoes consistent deflection of the contact surface as the ground contacting point shifts along the length of the roller, the distance between the ground and the wheel axle 4 remains nearly constant.

Grooves 23 may be oriented concentrically, longitudinally or angularly, or any combination thereof. Alternatively, the same stiffness-reducing effect can be achieved with siping, dimples, ridges or knobs, and all discussions of and references to grooves herein also apply to siping, dimples, ridges, and knobs. All combinations of groove orientations, siping, dimples, ridges, and knobs are contemplated in this invention.

The depth, width and spacing of grooves each affect the effective material stiffness of the roller contacting surface 10. A roller design with constant compliance under load is achieved by selecting a combination of groove width, depth and spacing that, for the thickness and mechanical properties of the roller contacting surface 10 material, roller diameter, and applied load, is necessary to match the compliance of the grooved portion with the compliance at the roller ends 20 and adjacent to the gap 21.

FIG. 5 shows a roller 6 with two zones on each roller segment 18; a zone with grooves 23, and zones with no grooves near the roller ends 20 and adjacent to the gap 21. In another variant of this embodiment of this invention, the average stiffness of the roller contacting surface 10 can be designed to vary continuously across the surface by placing grooves at design-determined locations over the entire roller surface such that the spacing between each groove, and thus the average surface stiffness, decreases moving from the roller end 20 to a minimum spacing near the roller segment midpoint, and then increases moving from the roller midpoint to the surface adjacent to the gap 21. Such a roller would have few, shallow grooves near the roller ends 20 and the gap 21 that become progressively deeper, wider and more closely spaced toward the midpoint of the roller segment 18. A roller designed with appropriately varying groove dimensions would exhibit constant compliance under load and therefore would demonstrate even lower vibration in operation on a heavy load vehicle than would a roller with just two surface zones (i.e. a grooved zone and a not-grooved zone).

A roller 6 designed using only grooves 23 to achieve constant compliance along the length of the roller may have a convexedly vaulted shape with a "round profile" defined above. Thus, an omni-directional wheel incorporating this embodiment of the invention may present a round profile when viewed from a perspective laterally displaced from and coincident with the wheel's axle. This embodiment has the advantage that the wheel will exhibit a smooth ride when the vehicle is lightly loaded, in contrast to the first embodiment which, because of its deviation from the "round profile" defined above, will exhibit varying ride height when rotated while supporting very small loads.

It will be appreciated by one skilled in the art that the use of grooves will provide the same ride-enhancing benefits in roller designs comprised of one, two, three or more roller segments, where grooves are incorporated in some areas of some segments. Contemplated within the scope of this invention are all possible configurations and segmentations of rollers where grooves are used to adjust surface stiffness to achieve constant compliance across the entire roller.

It is noteworthy that the use of grooves in this invention is for purposes other than increasing traction which has been disclosed previously, although the grooves will have traction-improving effect. A roller using grooves designed only to improve traction without one of the embodiments of this invention will demonstrate varying compliance and thus vibration and ride height fluctuation in operation on a loaded vehicle.

Figure 6:
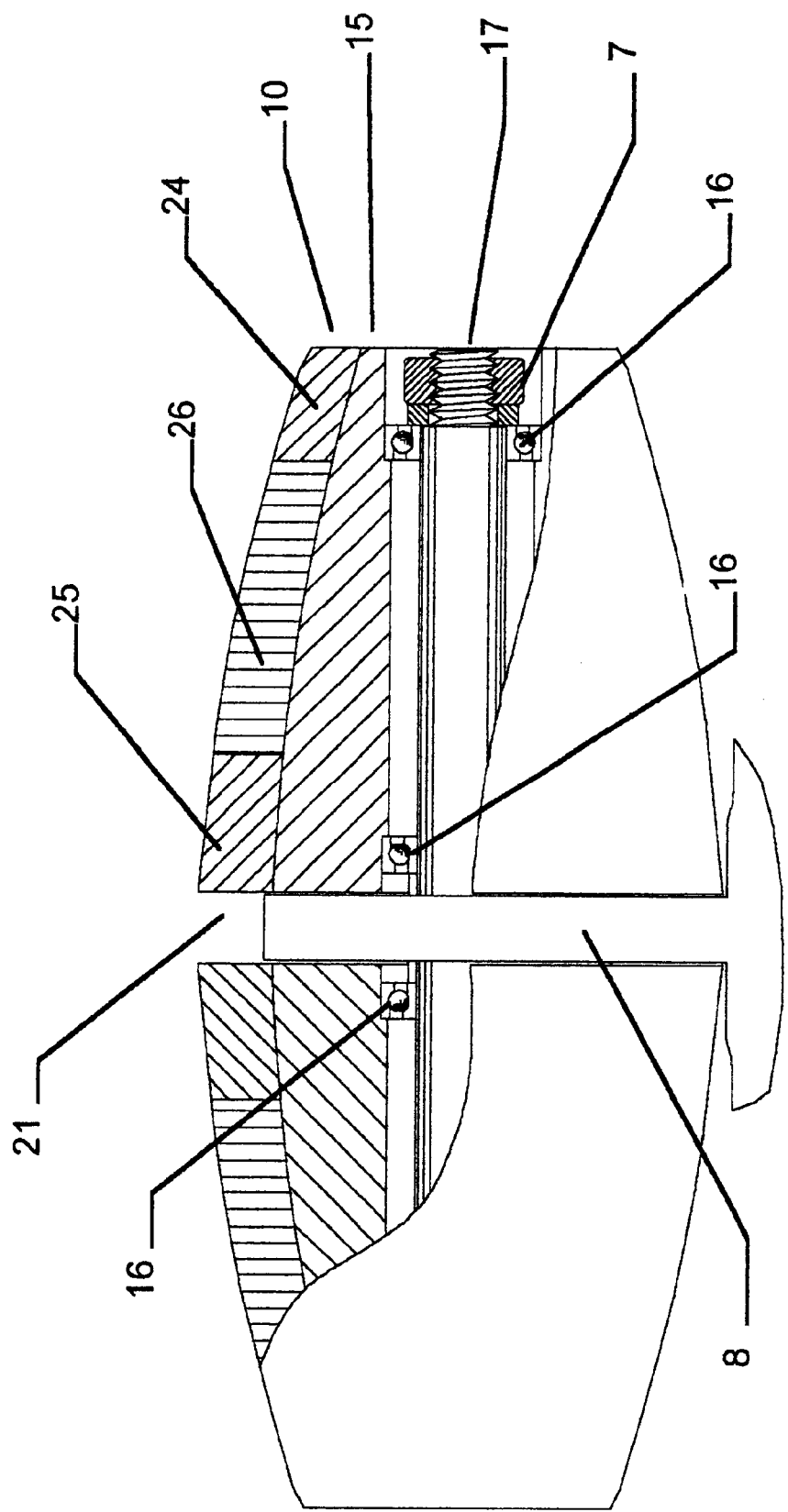
FIG. 6 is a sectional view of a roller for an omni-directional wheel showing roller structure and an embodiment that achieves low vibration operation by means of zones in the contacting surface that have different coefficients of stiffness.

Referring to FIG. 6, a third preferred embodiment of this invention achieves low vibration. operation by varying the material stiffness of the roller contacting surface 10 along the length of the roller 6 by using different materials or formulations of elastomer. Specifically, in the zones near the roller ends 24 and adjacent to the gap 25, the roller contacting surface 10 is made of a material with greater stiffness than the material in the zone 26 near the midpoint of the roller segment. The greater stiffness of the material in the zone near the roller end 24 compensates for the increased compliance that happens due to the smaller diameter of the roller ends. The greater stiffness of the material in the zone near the roller gap 25 compensates for the increased compliance that happens due to the reduced structural support adjacent to the gap 21.

The materials used in the various zones of the roller in this embodiment are selected to achieve nearly the same compliance as the point of contact with the ground moves along the length of the roller. Depending upon the shape, size and diameter of the roller 6 and the width of the gap 21, the material in the roller end zone 24 may have the same or different stiffness as the material in the gap-adjacent zone 25.

A roller 6 designed using different roller contacting surface material zones to achieve constant compliance along the length of the roller may have a convexedly vaulted shape with a "round profile" as defined above. Thus, a wheel incorporating this embodiment of the invention may present a "round profile" when viewed from a perspective laterally displaced from and coincident with the wheel's axle. This embodiment, like the second embodiment, has the advantage that the wheel will exhibit a smooth ride when the vehicle is lightly loaded, in contrast to the first embodiment that, because of its deviation from the "round profile" defined above, will exhibit varying ride height in operation when supporting very light loads.

Figure 7:
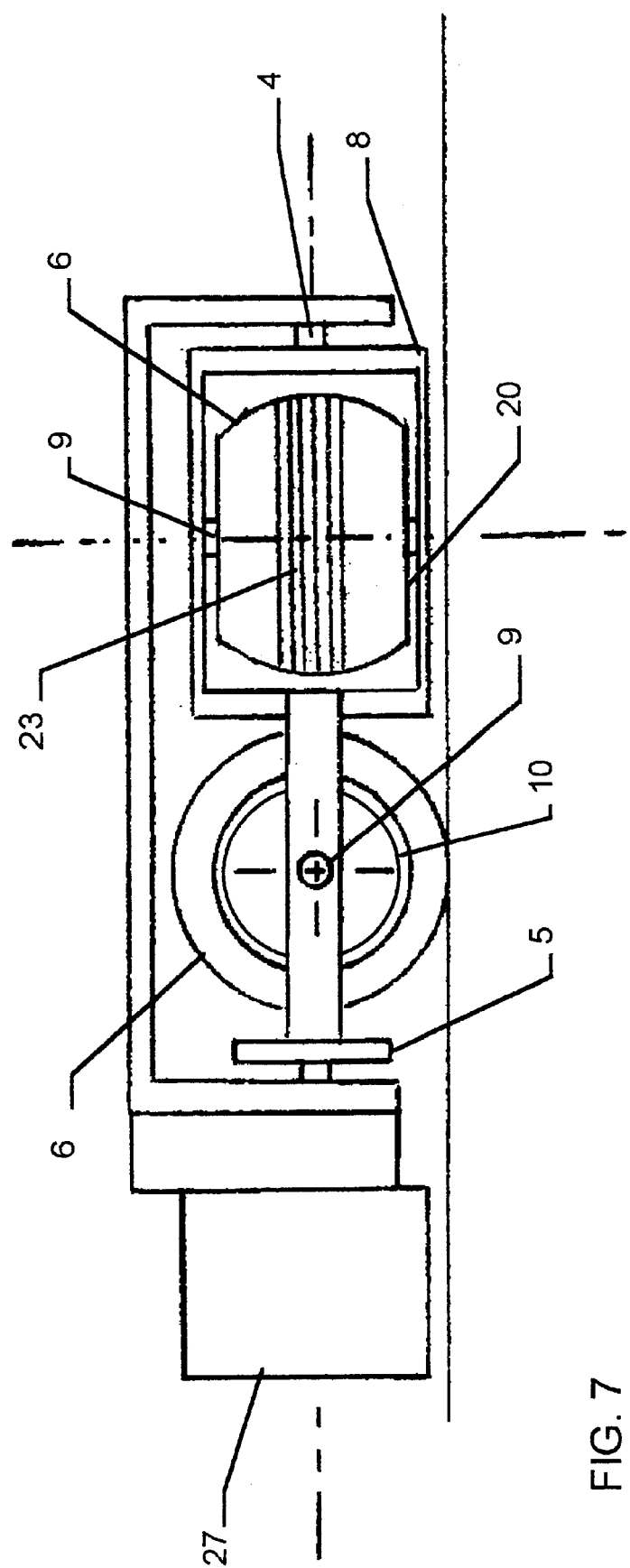
FIG. 7 shows a perspective view of an alternative omni-directional wheel with roller axles mounted at ninety degrees to the wheels axis of rotation and incorporating an embodiment that achieves low vibration operation by means of grooves in the contact surface.

This invention benefits all omni-directional wheels that use a plurality of rollers on each wheel to enable motion in any direction. For example, FIG. 7 shows an omni-directional wheel incorporating a roller mounting angle of ninety degrees and two rollers 6. The hub 5 is connected to the wheel axle 4, which is connected to a drive motor 27. A roller mounting bracket 8 is coupled to the hub 5 and encircles the rollers 6 so as to provide support for the roller axles 9. The roller mounting bracket 8 may be formed from a single piece enclosing both rollers or may be two or more pieces coupled together. FIG. 7 shows rollers 6 incorporating grooves 23 to achieve constant compliance performance, but the rollers may incorporate any one or combination of the embodiments of this invention. In operation, when the hub 5 is rotated by the drive motor 27, the point of contact with the ground will shift over the surface of each roller 6 in turn. Since the ground contacting surface 10 near the ends of the roller 20 is not continuous, the roller 6 will exhibit greater compliance when the point of contact with the ground is near the roller ends 20 than when the point of contact is midway between the ends. Thus, wheels of the design illustrated in FIG. 7 will suffer uneven compliance, and as a consequence high vibration when rotated while supporting a load, unless the rollers incorporate one or more of the embodiments of this invention.

It will be appreciated by one skilled in the art that the use of different material zones will provide the same ride-enhancing benefits in roller designs comprised of one, two, three or more roller segments, where different material zones are incorporated in some parts of some segments. Contemplated within the scope of this invention are all possible configurations and segmentations of rollers where different material zones are used to adjust contact surface material stiffness to achieve constant compliance across the entire roller.

Contemplated within the scope of this invention is the use of any combination of any or all of the three embodiments described herein to achieve constant compliance of the roller contact surface across the surface of the roller under a variety of design conditions. Depending upon various design parameters, such as vehicle weight, omni-directional wheel diameter, roller mounting angle, number of rollers, roller length, roller diameter, number of roller segments, roller gap thickness, surface contacting material and ground surface characteristics, it may not be practical to design a low-vibration omni-directional wheel that uses only one of the embodiments described herein. The use of a non "round profile" roller with grooving may have better overall ride and wear characteristics than is possible with one or the other embodiment alone. Using a combination of a non "round profile" design roller with zones of different roller contacting surface material could reduce vibration induced as the loaded area shifts from one material zone to the next.

The three embodiments of the invention have slightly different advantages. The first preferred embodiment is best suited for wheels that will be subjected to constant high loading which fluctuates between approximately 75 percent to 100 percent of rated load. The first embodiment also works best when the flat surface over which the omni vehicle operates is somewhat sensitive to high contact pressures.

The second and third embodiments are best suited to vehicles that will carry varying loads. These embodiments will provide a smoother ride at vehicle loads that are a low percentages of the maximum rated load by virtue of the fact that the roller profiles match the "round profile" shape. Omni-directional wheels designed and constructed using the second and third embodiments of the invention will have higher contact pressures and greater percentage deflection, and thus somewhat reduced load capacity as compared with omni-directional wheels designed and constructed using the first embodiment of the invention.

Rollers incorporating the first, second, and third embodiment of the invention are possible and may be the optimum design in some applications.

Using one or a combination of non "round profile" shape, grooving and different material zones in rollers for omni-directional wheels will result in a number of practical benefits. Smooth riding omni-directional wheels permit an omni-directional vehicle to travel at higher speeds without creating excessive vibration, and therefore broaden the applicability of omni-directional vehicle technology. The greater contact surface material thickness near the roller ends decreases the shearing force in the bond between the contact surface material and the roller core. Decreased shearing force in the contact-surface-material-to-core bond results in increased operational life of the roller. Rollers that display constant compliance across their profile may have a higher design load capacity, because the load capacity will not be limited by the capacity of the roller contacting surface material at the roller ends or adjacent to the roller gap. A roller with constant compliance under load will exhibit a nearly constant footprint in contact with the ground as the ground contact point moves along the roller length, which decreases the maximum footprint pressure of the roller compared to a roller designed in accordance with the prior art which will exhibit variable footprint pressure in operation. Lower maximum footprint pressure reduces roller wear, and thereby increases the useful life of the roller. Lower maximum footprint pressure also permits the omni-directional vehicle to carry heavier loads or operate on surfaces with lower compression strength, such as concrete, sheet metal or wood decking.

The appropriate design of any of the three preferred embodiments and any combination of any two or all three is achieved by determining the elastomer material thickness and properties necessary to achieve compliance that is nearly constant as the wheel is rotated under design loads. To accomplish this, the compliance of the roller is estimated for each increment of omni-directional wheel rotation as the load is supported first at the end, then the middle, and then the opposite end of the roller. This calculation must consider both the roller diameter at the point of contact with the ground and the angle between the ground and the roller axle, because the geometry of the roller's contact with the ground is constantly changing as the wheel rotates.

A mathematical relationship that describes the deflection of a prismatic elastomer coated roller in response to an applied loads has been known for some time. One variation of this relationship has been described by A. I. Hoodbhoy in Plastics Engineering, Vol. 32. No. 8, August 1976 and is repeated as equation (1) below:

Prismatic Elastomer Coated Wheel Deflection, $U=[3W(B-A)/(4ES(8B)^{1/2})]^{2/3}$ (1)

Where:
W=Load;
B=Outside Diameter;
A=Inside Diameter;
E=Elastomer Modulus; and
S=Tire Width.

Equation (1) is applied in a unique manner in the present invention to accurately predict the compliance of an omni-directional wheel and its response to an applied load for any angle of rotation. Specifically, the roller is modeled as many narrow slices that are each treated as individual prismatic wheels with the elastomer thickness, properties and outer diameter corresponding to the particular slice of the roller. The number of slices used in the calculation can range from 100 to 150 for a single roller. As an example, a 13 inch long roller could be modeled with as few as 100 prismatic rollers 0.13 inches in thickness, or with as many as 150 prismatic rollers 0.87 inches in thickness. Each of the prismatic wheels that represent the roller are treated as being aligned concentrically along the roller shaft axis.

When an omni-directional wheel is rotated to such a point that the roller shaft is parallel to the ground surface, the thickness of the elastomer for each slice used to represent the roller matches the actual thickness of the roller. When the wheel is rotated further, the roller shaft will no longer be parallel to the ground surface, and the elastomer thickness measured at right angles to the roller shaft must be reduced by multiplying the thickness times the cosine of the angle between the roller axle and the ground surface. The angle that the roller axle makes with the ground surface is calculated using equation (2):

$\Theta$=Arcsine [cosine (roller mounting angle) sine (wheel rotation angle)]. (2)

The roller mounting angle is typically 45 degrees but can range from about 20 to 90 degrees, and the wheel rotation angle varies from 0 to 360 degrees.

The vertical distance H from a plane through the wheel axis and parallel to the ground surface to the lowest point on any roller slice is calculated using equation (3):

H=Cosine $(\theta)$[Ri+xi tangent $(\theta)$]+RR cosine(wheel rotation angle) (3)

where
$\theta$=angle between roller shaft and ground surface;
Ri=exterior radius of roller at a distance xi from the roller mid point measured along the roller axle;
xi=distance from the mid point of the roller measured along the roller axle; and
RR=radius of the roller mid point from the wheel center.

The lowest point on the undeflected roller slice with the greatest vertical distance from a plane coincident with the wheel axis and parallel to the ground surface will always be in contact with the ground surface, even at very small loads. This vertical distance is the undeflected wheel diameter at that particular angle of wheel rotation. As the load is increased, the roller elastomer will deflect in response, and the plane coincident with the wheel's axis and parallel to the ground will move closer to the ground. This is modeled as bringing adjacent slices of the roller into contact with the ground surface. The deflection of adjacent roller slices will be smaller than the roller slice with the greatest vertical distance from a plane coincident with the wheel axis and parallel to the ground surface at that particular wheel rotation angle. In this way, a designer can determine the deflection of adjacent slices as a function of the roller geometry, wheel rotation angle, roller dimensions, and total wheel deflection.

For a given value of wheel deflection and rotation, the designer can estimate the load carried by each slice using equation (1). Summing these loads provides an estimate of the total load on the wheel to produce the value of wheel deflection. Repeating this calculation for a range of deflections will enable the load-to-deflection characteristics of the wheel to be plotted for any wheel rotation angle. Repeating these steps for many wheel rotation angles, such as in 5 degree increments, will provide data that characterizes the wheel's performance under load.

Wheel ride height can be estimated by subtracting the deflection from the undeflected wheel diameter described above. Wheel ride height will range from a maximum of the aforementioned undeflected wheel diameter to a value that will decrease with increasing load. This can be represented as a surface plotted with wheel rotation angle and applied load as independent variables and wheel ride height as a dependent variable. This method of analytically characterizing an omni-directional wheel's performance is well suited to spreadsheet computation.

A corollary product of the above omni-directional wheel ride height prediction is the estimation of the percent deflection of the elastomer. This is the ratio of the wheel deflection to the undeflected elastomer thickness at the point of contact with the ground. Values for percent deflection are readily predicted using the above described process. The omni-directional wheel designer may plot peak values of percent deflection as a function of loading and rotation angle. A maximum of 25% deflection should not be exceeded.

With these analysis methods a designer can design an omni-directional wheel and rollers to implement this invention as follows. First, select the roller size and diameter that is appropriate for the omni-directional wheel, vehicle and design load. Second, determine the best means to support the rollers, and design the appropriate mounting bracket, core, axle and bearing structure. Third, determine the maximum elastomer thickness that will afford adequate roller core and axle material thickness and cross section. Fourth, calculate the roller's ride height and percent of elastomer deflection using the multi-slice analysis method described above. Note where flat spots and elastomer deflection will exceed 25 percent. Fifth, add small amounts of elastomer to the outer diameter to bring flat spots in the ride height into conformity with the rest of the roller. Additions to the outer roller diameter beyond the "round profile" may be added where the roller contacts the ground surface at the wheel rotation angles where a flat spot occurs. Typically this will be around supports and near the roller ends which are of smaller diameter. Adding an amount to the roller outer diameter equal to twice the deviation of the flat spot from the desired ride height will bring the roller design close after only a few design iterations. Alternatively, change the stiffness of parts of the ground contacting material by adding grooved zones or zones of material with a different stiffness. Sixth, repeat the calculation of the wheel's ride height and percent elastomer deflection as a function of load and rotation angle after each alteration in the roller outer diameter profile. Finally, repeat this design process until satisfied that the wheel ride height fluctuation will be acceptably small and peak percent deflections are below the maximum allowable. If an elastomer deflection below 25 percent cannot be achieved at the desired load capacity, a larger wheel or a wheel with fewer rollers may be necessary. This design method may result in increases in the outer diameter and thickness of the elastomer within the ranges listed in the following table:

| Location Along Roller Axis | Range In Percent Increase In Elastomer Thickness Over "Round Profile" | Range in Percent Increase In Roller Outside Diameter Beyond "Round Profile" |
| --- | --- | --- |
| Near Supports | 8–30 | 2–8 |
| Between Supports | 3–25 | 1–7 |
| Extreme End | 5–36 | 1–11 |

While various embodiments of the present invention have been described above and in the drawings, it should be understood that they have been presented only as examples, and not as limitations. In particular, the invention is applicable to all omni-directional wheel designs whether designed with roller mounting angles of ninety, forty five or any other roller mounting angle, and any number of rollers. The invention is applicable to all classes of omni-directional wheel designs since all suffer from the same ride height variation problem. Thus, the breadth and scope of the present invention should not be limited by any of the above-described exemplary embodiments, but should be defined only in accordance with the following claims and their equivalents.

I claim:

1. A method for designing an omni-directional wheel that will result in low vibration when rotated under load, comprising the steps:

determining the shape of the rollers that will result in a circular profile of an omni-directional wheel when viewed from a perspective removed from and coincident with the axis of rotation of said omni-directional wheel;

mathematically modeling the rollers as an assemblage of thin prismatic wheels aligned orthogonal to the centerline of the roller to estimate its compliance when contacting a flat running surface under load and at all angles of rotation;

determining the coating thickness and exterior dimensions, surface grooves, and material properties required for each roller such that the wheel exhibits the same compliance at all angles of wheel rotation when loaded; and adjusting the roller design to incorporate said changes in shape, surface grooving and material properties resulting in said omni-directional wheel having a non-circular profiled when viewed from a perspective laterally removed from and coincident with the axis of rotation of said omni-directional wheel.

2. The method for designing an omni-directional wheel according to claim 1, further comprising the step of producing drawings based upon the roller design suitable for use in manufacturing the rollers.

3. The method for designing an omni-directional wheel according to claim 1, further comprising the steps of:

repeating the step of determining the coating thickness and exterior dimensions, surface grooves, and material properties required for each roller such that the wheel exhibits the same compliance at all angles of wheel rotation when loaded at a number of loads covering a range of loads; and adjusting the roller design so that the wheel exhibits minimum variation in compliance at all angles of wheel rotation over the range of loads.

4. The method for designing an omni-directional wheel according to claim 1, wherein the steps are performed by a computer according to a software program.

* * * * *